United States Patent Office 3,000,891
Patented Sept. 19, 1961

3,000,891
1-THENOYLALKYL-4-AROYLPIPERAZINES
Paul A. J. Janssen, Antwerpse Steenweg 16, Vosselaar, near Turnhout, Belgium
No Drawing. Filed Nov. 16, 1959, Ser. No. 852,952
5 Claims. (Cl. 260—268)

This invention relates to a new group of piperazine derivatives and more particularly to 1-thenoylalkyl-4-aroylpiperazine of the general structural formula

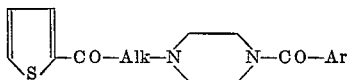

and the pharmaceutically useful non-toxic salts thereof wherein Alk is a lower alkylene radical containing at least 3 carbon atoms; and Ar is a member of the class consisting of phenyl, halophenyl, pyridyl, and thienyl radicals.

The radical Alk is a bivalent saturated hydrocarbon radical such as butylene, trimethylene, tetramethylene, pentamethylene, and hexamethylene.

The compounds of this invention can be prepared by the condensation of a compound of the structural formula

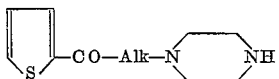

with a compound of the formula

Halogen—CO—Ar wherein Alk and Ar are defined as above. The reaction can be carried out in an inert solvent such as an aromatic hydrocarbon (e.g. benzene, toluene, xylene); a lower alkanol (e.g. ethanol, butanol, propanol); or a lower alkanone (e.g. acetone, butanone, or hexanone). In certain cases the reaction may be usefully accelerated by elevated temperatures.

The thenoylalkylpiperazine intermediates used in the above procedure can be conveniently prepared by the condensation of a compound of the formula

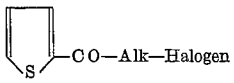

with piperazine.

The thenoylalkyl halides used as intermediates can be prepared conveniently by the Friedel-Crafts reaction including its mild variations employing, for example, γ-chlorobutyryl chloride in thiophene. These intermediates can also be prepared by the reaction of an ω-haloalkylnitrile with an appropriate aryl magnesium bromide followed by an acid hydrolysis of the adduct.

The compounds of this invention can also be prepared by the condensation of a compound of the formula

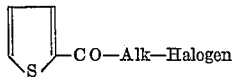

with a compound of the formula

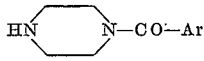

The compounds of this invention have useful pharmalogical properties. They are potent depressants of the central nervous system as exhibited by their ability to act as hypnotics in mice and their ability to potentiate the effect of barbiturates in mice.

The compounds which constitute this invention and their methods for preparation will appear more fully from a consideration of the following examples which are given for the purpose of illustration only and are not to be construed as limiting the invention in spirit or in scope. In these examples quantities are indicated in parts by weight; temperatures are given in degrees centigrade (° C.) and pressures in millimeters of mercury (mm.).

Example 1

To a boiling solution of 12.2 parts of 2-(γ-chlorobutyryl)thiophene in 20 parts of toluene is added 72 parts of anhydrous piperazine in 100 parts of toluene with stirring. After the addition is complete, the stirring and boiling is continued for 2 hours and then the mixture is cooled and filtered. The filtrate is decolorized with activated charcoal and evaporated. The residue is dissolved in ether. After chilling the ethereal solution at —20° C., a solid precipitates which is collected on a filter and dried to yield 1-[γ-(2-thenoyl)propyl]piperazine melting at about 51–54° C.

To a solution of 7.1 parts of 1-[γ-(2-thenoyl)propyl]-piperazine, 40 parts of benzene and 55 parts of a 10% aqueous sodium hydroxide solution is added portionwise a solution of 4.8 parts of 4-fluorobenzoyl chloride in 20 parts of benzene. The mixture is heated at 70° C. for 1 hour with stirring. After cooling the layers are separated. The water layer is extracted with benzene. The combined benzene layers are washed with water, dried over sodium sulfate, and evaporated. The residue is crystallized from ether by chilling at —20° C. to yield a white amorphous powder of 1-[γ-(2-thenoyl)propyl]-4-(4-fluorobenzoyl)piperazine melting at about 82.5–83.5° C. The compound has the structural formula

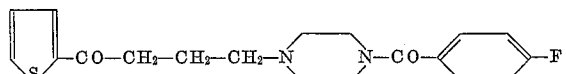

A solution of 160 parts of 4-phenyl-4-bromo piperidine hydrobromide in 3000 parts of water is treated with 100 parts of 20% sodium hydroxide solution. The resulting precipitate is recovered by filtration and washed with water. The precipitate is then dissolved in toluene, and the solution is dried over anhydrous potassium carbonate and filtered. The filtrate is cooled to 0° C. The crystalline product thus obtained is collected on a filter to yield 4-phenylpiperidin-4-ol melting at about 159–160° C.

By substituting 2-(δ-chloropentanoyl)thiophene for 2-(γ-chlorobutyryl)thiophene and benzoyl chloride for 4-fluorobenzoyl chloride, in the above procedure, 1-[δ-(2-thenoyl)butyl] - 4 - benzoylpiperazine is obtained. The compound has the structural formula

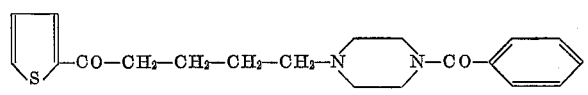

Example 2

By substituting 4.5 parts of nicotinyl chloride in the procedure of Example 1 and crystallization from a 1:2 by volume mixture of petroleum ether and diisopropyl ether and then recrystallization from ether by chilling at —20° C., 1-[γ-(2-thenoyl)propyl]-4-nicotinylpiperazine melting at about 64.6–65.8° C. is obtained. The compound has the structural formula

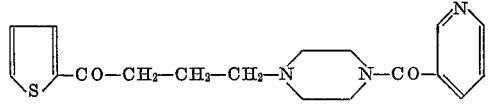

Example 3

By equimolar substitution of 2-thenoyl chloride for 4-fluorobenzoyl chloride in the procedure of Example 1 and crystallization from ether by chilling at −20° C., 1-[γ-(2-thenoyl)propyl]-4-(2-thenoyl)piperazine melting at about 85.6–87.4° C. is obtained. The compound has the structural formula

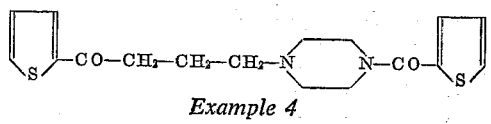

*Example 4*

By substituting 8 parts of 3-iodobenzoyl chloride for 4-fluorobenzoyl chloride in the procedure of Example 1, 1-[γ-(2-thenoyl)propyl]-4-(3-iodobenzoyl)piperazine is obtained. The compound has the structural formula

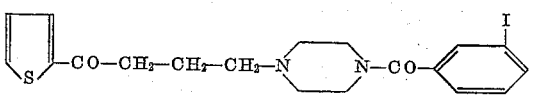

What is claimed is:
1. A compond of the formula

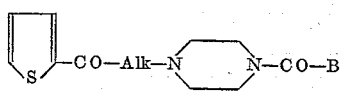

wherein Alk is a lower alkylene radical, and B is a member of the class consisting of halophenyl, thienyl, and pyridyl radicals.

2. A compound of the formula

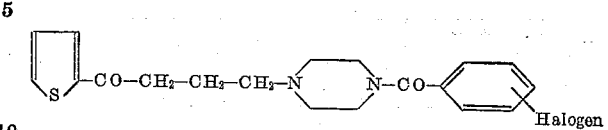

3. 1-[γ-(2-thenoyl)propyl]-4-(4-fluorobenzoyl)piperazine.
4. 1-[γ-(2-thenoyl)propyl]-4-nicotinyl piperazine.
5. 1-[γ-(2-thenoyl)propyl]-4-(2-thenoyl)piperazine.

References Cited in the file of this patent

FOREIGN PATENTS 789,704    Great Britain _____ Jan. 29, 1958

OTHER REFERENCES

Pollard et al.: Jour. Amer. Chem. Soc., vol. 76, pages 1853–1855 (1954).